UNITED STATES PATENT OFFICE.

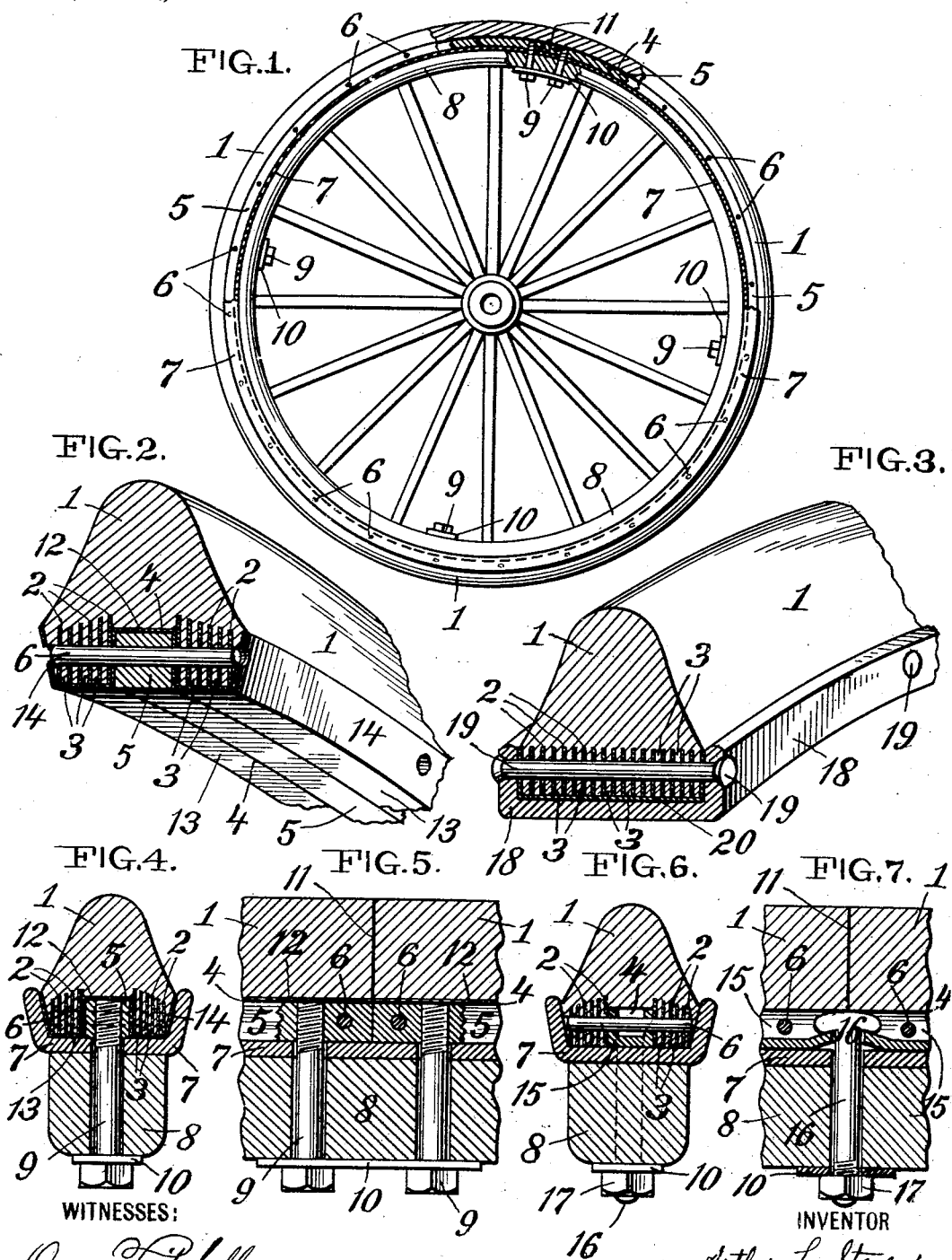

ARTHUR L. STEVENS, OF NEW YORK, N. Y.

VEHICLE-WHEEL TIRE AND FASTENING.

SPECIFICATION forming part of Letters Patent No. 711,081, dated October 14, 1902.

Application filed January 9, 1902. Serial No. 88,965. (No model.)

*To all whom it may concern:*

Be it known that I, ARTHUR L. STEVENS, a citizen of the United States of America, residing in the borough of Manhattan, city of New York, State of New York, have invented certain new and useful Improvements in Vehicle-Wheel Tires and Fastenings, of which the following is a specification.

My invention relates to vehicle-wheel tires, and has for its more special object to provide a noiseless tire having a substantially solid elastic body and tread the base of which is reinforced to enable it to resist destructive wear or tearing out by pins or bolts passed transversely through it and forming portions of fastenings holding the integral tire rigidly to a wheel-rim in manner avoiding dangerous "creeping" of the tire on or around said rim.

My improved tire is specially well adapted for quick and easy application or renewal within the side-flanged channel-iron or between metal flange-plates commonly used on fellies or rims of vehicle-wheels.

The invention includes certain novel features of construction of the elastic tire and of the fastenings employed to secure it to the wheel-rim, all as hereinafter described and claimed.

Reference is made to the accompanying drawings, forming part of this specification, and in which—

Figure 1 is a sectional side view of a vehicle-wheel fitted with one form of my improved elastic tire, one side flange of the channel-iron being partly cut away and the tire also being partly broken out to more clearly illustrate the tire-fastening strip. Fig. 2 is a sectional perspective view of a portion of the tire and fastening-strip shown in Fig. 1. Fig. 3 is a sectional perspective view of a modified form of my improved tire as held to the wheel-rim by rivets or bolts passing transversely through the fabric-reinforced tire-base and metal side flanges between which the tire is held on the wheel-rim. Fig. 4 is a cross-sectional view of the elastic tire and wheel-rim shown in Fig. 1. Fig. 5 is a sectional view, in the plane of the wheel, of the parts shown in Fig. 4 and illustrates one preferred method of securing the elastic tire at its butt-end joint to the wheel-rim. Fig. 6 is a cross-section of the wheel-rim, channel, and the elastic tire with a fastening-strip of slightly-modified form in the tire-base; and Fig. 7 is a sectional view, in the plane of the wheel, of the parts shown in Fig. 6 and illustrates a method of securing the butt-end joint of the tire to the wheel-rim by a single bolt.

I first refer more particularly to Figs. 2 and 3 of the drawings, in which the numeral 1 indicates the substantially solid elastic body and tread of the tire. Within the tire-base are arranged a series of independent strips or layers of reinforcing fabric 2, which are disposed about vertically edgewise and approximately in the general plane of the tire or wheel or in such range edgewise as will permit transverse fastening pins or bolts to be passed directly through said fabric layers while passing through openings made transversely in the base portion of the tire. These basal fabric layers 2 are separated by inwardly-extending adhering layers or strata 3 of the material of the elastic main body and tread of the tire. When the tire is in use, its fabric-reinforced or composite base 2 3 rests directly upon the rim of the wheel or within a side-flanged channel-iron fixed to the wheel-rim, or the composite tire-base may rest within a channel formed by the wheel-felly or a metal tire thereon and metal flange-plates fixed to opposite sides of the felly and to the tire, or the fabric-reinforced tire may be otherwise held to the wheel-rim.

Any suitable substances may be used or any approved methods of manufacture may be adopted to cause the vertical basal fabric layers 2 and tire strata 3 to closely adhere, so as to assure a firm adhesive contact between every part of both faces and the outer edge of each fabric layer 2 and said separating-strata 3 and the outer more elastic main tread portion 1 of the tire. I prefer to make the tire body and tread 1 and strata 3 of rubber or rubber compound ordinarily used in tire manufacture, and I incorporate the series of vertically-disposed fabric layers 2, the rubber strata 3, and the more elastic outer portion or tread proper, 1, into an integral or homogeneous tire structure preferably by vulcanizing the whole together in a mold in manner well known in this art.

When one or more horizontal layers or strips of reinforcing fabric are for any purpose arranged circumferentially at and around or within the base of a vehicle-wheel tire, there is a decided tendency as the tire wears under traction strains to separation or stripping or peeling of one or more of these circumferential fabric layers from the adjoining layers or from the elastic tread. Furthermore, a tire built up with such circumferential or horizontal reinforcing fabric layers is not well adapted for most secure anticreeping basal fastening to a wheel-rim by rivets or bolts passed transversely through the tire and a channel-iron or side flange-plates fixed to said rim, as such transverse fastening rivets or bolts if passed through or between such horizontal basal fabric layers would directly tend to separate them and quickly rupture the tire under traction strains. In my invention the series of fabric layers embedded in the tire-base about vertically edgewise in the general plane of the tire or wheel are securely held in the solid body and tread of the tire and prevent horizontal splitting or rupture of the tire. Said vertically-disposed fabric layers also offer most direct and effective resistance to tearing out of the tire by transverse pins passed through the tire-base and adapted, with other fastenings, to assure a positive anticreeping connection of a tire to a wheel-rim. Maximum efficiency and durability of my tire thus are assured, not only upon wheels of lighter horse-drawn vehicles, but also upon wheels of heavier automobiles, which are subjected to great traction strains.

To make a simple and effective fastening for one form of my improved tire to hold it to and within the side-flanged metal channel ordinarily used at wheel-rims or between opposite side flange-plates fixed to the wheel-felly, I prefer to form in the bottom of the tire a continuous annular slot or groove 4, which in one adaptation (shown in Figs. 1, 2, 4, and 5 of the drawings) receives a square-section fastening-strip 5, which is fixedly held to and within the tire-body and at all points around the wheel or wheel-rim by any suitable means passed through transverse holes made directly through the inserted fabric layers 2 and their separating-strata 3 at the tire-base, transverse metal pins 6 being preferably used for this purpose. These pins 6 are shown in dotted lines in Fig. 4 and in cross-section in Figs. 1, 5, and 7 and in full view in Figs. 2 and 6 of the drawings. Said pins 6, together with other auxiliary fastenings presently described, assure the above-mentioned most secure anticreeping connection of the tire to the wheel-rim.

When my improved tire is arranged within the ordinary flaring flanged peripheral channel-iron 7, fitting around the wheel-rim 8, the two opposite side faces of the composite or fabric-reinforced tire-base are flared upward to fit within this channel. After the tire, provided, as above described, with its fixed fastening-strip 5, is fitted into the channel around the wheel-rim the tire may be fastened to said rim by any suitable means engaging the rim and said fastening-strip. For this purpose I may use ordinary bolts 9, passed radially outward through the wheel-rim 8 and channel 7 and screwed directly into the substantially immovable tire-fastening strip 5, as shown in Figs. 1, 4, and 5 of the drawings, washers 10 being preferably used under the bolt-heads. In Fig. 5 are shown more clearly two bolts 9, one at each side of the endwise-abutting joint at 11 of the tire and its fastening-strip; but it will be understood that a number of these bolts may be used at different points around the wheel-rim and as shown in Fig. 1 of the drawings.

It is obvious that with this tire construction and method of fastening relative circumferential movement or creeping of the tire and fastening-strip is prevented at all points around the wheel-rim, thus avoiding cutting of the tire by the fastening-strip and obviating "humping" of the tire on the fastening-strip or wheel-rim at one or more places and maintaining true circular contour of the tire on the wheel, while also preventing dangerous creeping of the tire and fastening-strip together on or around the wheel-rim and avoiding tearing out of the tire at or by its transverse pin or bolt-fastenings. Precisely similar durable and anticreeping connection of the tire would result if it were fitted around a wheel-felly (or upon an ordinary flat metal tire thereon) and between flange-plates fastened at opposite sides of the felly and therewith constituting a channel at the wheel-rim to receive the tire-base. In some uses of my improved tire it may not be essential to provide metal side flanges at the fabric-reinforced tire-base; but these are usually preferred as guards for opposite sides of the tire.

I prefer to reinforce the tire structure at its annular slot 4 with a fabric lining or covering 12, thereby promoting uniformity of size and smoothness of finish of the slot-walls within which the fastening-strip 5 is thus more easily fitted. I may also strengthen and smooth the bottom face of the tire by providing it at opposite sides of the slot 4 with a reinforcing lining or covering fabric 13. I may also cover the lower opposite side portions or faces of the tire with a suitable reinforcing fabric 14, giving a smooth finish and uniform size to the tire parts which fit within the opposite side flanges of the wheel-rim channel 7. I prefer to make these three linings or coverings 12 13 14 in or of one piece or strip of strong canvas, which is laid over suitably-shaped portions of the vulcanizing-mold and will vulcanize solidly to the walls of the whole base portion of the tire, as shown in Figs. 2, 4, and 5 of the drawings. Any one or two of said reinforcing linings or coverings or all three of them may be used as the differing size or material of the tire or the preferred manner of attaching it may make desirable or necessary.

Figs. 6 and 7 of the drawings show that I may use a fastening-strip 15 having a U-shaped cross-section and fixed by transverse pins 6 within the bottom slot 4 of the tire, and Fig. 7 shows that instead of using two bolts 9 9, one at each side of the abutting end joint 11 of the tire, I may use a single bolt 16, having a fixed head provided with hooking inclined under faces which overlie upswaged inclined portions of the bottom of the channel 15, to lock both ends of the fastening-strip and tire together. The elastic tire-body permits the bolt 16 to be forced inward through the tire-joint and passed through the channel 7 and wheel-rim 8, and the bolt-nut 17 then is applied next the washer 10 at the inner face of the wheel-rim. At other suitable places the fastening-strip and channel and tire will preferably be secured to the wheel-rim by bolts like those marked 9 in Figs. 1, 4, and 5 of the drawings. The fabric lining 12 13 14 for the slot 4 and the bottom and lower side faces of the tire is omitted in Figs. 6 and 7 of the drawings, and as may be done without serious disadvantage in making, applying, or using some forms of my improved tire.

The modified tire (shown in Fig. 3 of the drawings) has the improved composite base of fabric layers 2, separated by adhering strata 3, projecting inward from the more elastic outer body and tread portion 1, but does not have the continuous bottom slot and the internal fastening-strip therein. This modified form of tire is shown fastened to and within a channel-iron 18, having right-angular or non-flaring opposite side flanges, by rivets or bolts 19, passed through the flanges and the composite tire-base. The channel 18 may be secured by radial bolts or otherwise to the wheel-rim or may be simply shrunk onto said rim. A reinforcing fabric lining 20 is preferably vulcanized to the bottom and lower side faces of this tire. This is a very efficient construction for broad-tread tires used on wheels of heavy vehicles.

I now prefer to use a metal fastening strip or part in the tire-base; but this strip or part may be made of any other suitable inelastic or sufficiently-hard material, provided it remain fixedly in the tire-slot, so as to prevent relative circumferential movement of the strip or part and the tire to obviate humping or creeping or cutting of the tire when it is secured to the wheel by means engaging said fastening strip or part and the wheel-rim.

One special object of my invention is to provide a tire having an elastic body and tread portion and secure fastenings of such character as will permit ready and inexpensive renewal of worn-out tires upon the ordinary standard flaring flanged channels of vehicle-wheels. Considerable difficulty has arisen in providing a secure fastening for ordinary all-elastic tires in these channels. I have constructed the tire-base with independent layers of fabric 2, which are disposed vertically or about in the general plane of the tire or wheel and are separated by inwardly-extending adhering layers or strata 3 of the elastic body and tread of the tire, thus making the tire-base comparatively inelastic and very strong and tough, to afford the strongest possible hold for fastenings of any suitable character passed transversely into or through the tire-base. It will be specially noticed that in my improved tire the independent canvas or fabric layers 2 each have direct adhesive contact through the separating adhering rubber layers 3 with the main elastic body and tread 1 of the tire, and thus every vertical independent fabric layer 2 individually offers direct resistance at the whole area of each of its adhering faces and at its outer edge to separation from the main elastic body and tread of the tire by traction strains.

The term "fabric" applied in this specification to the inserted layers 2 includes any material which will reinforce or strengthen the tire-base substantially in the manner and for the purposes herein set forth.

In the appended claims I have specified the composite tire-base as lying within the wheel-rim channel mainly to more clearly distinguish this fabric-reinforced base portion of my tire from fabric-reinforced side flanges of prior rubber tires which extend inward from the main body of the tire at opposite sides of the wheel-felly, to which the flanges are fastened by bolts or screws passed laterally through them into the felly. All such inner side flanges bear little or none of the load on the tire, while the composite base 2 3 of my tire which lies directly outside the wheel-rim periphery or within a channel thereon sustains practically all the weight of the load falling upon the inner portion of the tire.

I claim as my invention—

1. A vehicle-wheel tire comprising a substantially solid elastic body and tread having inserted in its base which lies within the wheel-rim channel a series of strips or layers of reinforcing fabric which are disposed vertically edgewise in the general plane of the tire or wheel and are separated by inwardly-extending adhering layers or strata of the body and tread of the tire and are adapted for passage through them of transverse pin or bolt fastenings applied at the base of the tire.

2. A vehicle-wheel tire comprising a substantially solid body and tread of rubber or rubber compound having vulcanized in its base which lies within the wheel-rim channel a series of strips or layers of reinforcing fabric which are disposed vertically edgewise in the general plane of the tire or wheel and are separated by inwardly-extending adhering layers or strata of the rubber body and tread of the tire and are adapted for passage through them of transverse pin or bolt fastenings applied at the base of the tire.

3. A vehicle-wheel tire comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having through its base, including said reinforcing fabric layers, transverse openings adapted to receive fastening-pins.

4. A vehicle-wheel tire comprising a substantially solid body and tread of rubber or rubber compound having vulcanized in its base which lies within the wheel-rim channel a series of layers of reinforcing fabric which are disposed vertically edgewise in the general plane of the tire or wheel and are separated by inwardly-extending adhering layers or strata of the rubber body and tread of the tire; said tire having through its base, including said reinforcing fabric layers, transverse openings adapted to receive fastening-pins.

5. A vehicle-wheel tire comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having through its base, including said reinforcing fabric layers, transverse openings adapted to receive fastening-pins; said tire also having a continuous annular bottom slot or groove adapted to receive a fastening-strip to be retained by pins passed through the transverse openings at the base of the tire.

6. A vehicle-wheel tire comprising a substantially solid body and tread of rubber or rubber compound having vulcanized in its base which lies within the wheel-rim channel a series of layers of reinforcing fabric which are disposed vertically edgewise in the general plane of the tire or wheel and are separated by inwardly-extending adhering layers or strata of the rubber body and tread of the tire; said tire having through its base, including said reinforcing fabric layers, transverse openings adapted to receive fastening-pins; said tire also having a continuous annular bottom slot or groove adapted to receive a fastening-strip to be retained by pins passed through the transverse openings at the base of the tire.

7. A vehicle-wheel tire comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire and are adapted for passage through them of transverse pin or bolt fastenings applied at the base of the tire, said tire having a continuous annular bottom slot or groove adapted to receive a fastening-strip, and reinforcing fabric lining or covering the walls of said slot.

8. A vehicle-wheel tire comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire and are adapted for passage through them of transverse pin or bolt fastenings applied at the base of the tire, said tire having a continuous annular bottom slot or groove adapted to receive a fastening-strip, and reinforcing fabric lining or covering the walls of said slot and the bottom and lower side faces of the tire.

9. A vehicle-wheel tire comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having a continuous annular bottom slot or groove, a fastening-strip in said slot, and means passed transversely through the tire-base, including its reinforcing fabric layers, and confining said fastening-strip within the tire-slot.

10. A vehicle-wheel tire comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having a continuous annular bottom slot or groove and reinforcing fabric lining or covering the walls of said slot, a fastening-strip in said fabric-lined slot, and means passed transversely through the tire-base, including its reinforcing fabric layers, and confining said fastening-strip within the fabric-lined tire-slot.

11. A vehicle-wheel tire comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having a continuous annular bottom slot or groove and reinforcing fabric lining or covering the walls of said slot and the bottom and lower side faces of the tire, a fastening-strip in said fabric-lined slot, and means passed transversely through the tire-base, including its reinforcing fabric layers, and confining said fastening-strip within the fabric-lined tire-slot.

12. The combination, with a vehicle-wheel having a peripheral channel, of a tire placed in said channel and comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having a continuous annular bottom slot or groove, a fastening-strip in said slot, means passed transversely through the tire-base, including its reinforcing fabric layers, and confining said fastening-strip within the tire-slot, and means engaging the wheel-rim and fastening-strip and securing the tire within the channel and to the wheel-rim.

13. The combination, with a vehicle-wheel having a peripheral channel, of a tire placed in said channel and comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having a continuous annular bottom slot or groove and reinforcing fabric lining or covering the walls of said slot, a fastening-strip in said fabric-lined slot, means passed transversely through the tire-base, including its reinforcing fabric layers, and confining said fastening-strip within the fabric-lined tire-slot, and means engaging the wheel-rim and fastening-strip and securing the tire within the channel and to the wheel-rim.

14. The combination, with a vehicle-wheel having a peripheral channel, of a tire placed in said channel and comprising a substantially solid elastic body and tread having inserted in its base which lies within the wheel-rim channel a series of layers of reinforcing fabric which are disposed vertically edgewise in the general plane of the tire or wheel and are separated by inwardly-extending adhering layers or strata of the body and tread of the tire; said tire having a continuous annular bottom slot or groove and reinforcing fabric lining or covering the walls of said slot and the bottom and lower side faces of the tire, a fastening-strip in said fabric-lined slot, means passed transversely through the tire-base, including its reinforcing fabric layers, and confining said fastening-strip within the fabric-lined tire-slot, and means engaging the wheel-rim and fastening-strip and securing the tire within the channel and to the wheel-rim.

15. The combination, with a vehicle-wheel having a peripheral channel, of a tire in said channel having a continuous annular bottom slot or groove, a hard or inelastic fastening-strip in said tire-slot, means engaging the tire-base and fastening-strip only and fixedly securing said strip within the tire-slot and preventing relative circumferential movement of the tire and strip all around the wheel-rim, and means engaging the wheel-rim and tire-fastening strip and securing the tire within the channel and to the wheel-rim.

16. The combination, with a vehicle-wheel having a peripheral channel, of a tire in said channel having a continuous annular bottom slot or groove, reinforcing fabric lining or covering the walls of said slot, a hard or inelastic fastening-strip within the fabric-lined tire-slot, means engaging the tire-base and fastening-strip only and fixedly securing said strip within the fabric-lined tire-slot and preventing relative circumferential movement of the tire and strip all around the wheel-rim, and means engaging the wheel-rim and fastening-strip and securing the tire within the channel and to the wheel-rim.

17. The combination, with a vehicle-wheel having a peripheral channel, of a tire in said channel having a continuous annular bottom slot or groove, reinforcing fabric lining or covering the walls of said slot and the bottom and lower side faces of the tire, a hard or inelastic fastening-strip within the fabric-lined tire-slot, means engaging the fabric-lined tire-base and fastening-strip only and fixedly securing said strip within the fabric-lined tire-slot and preventing relative circumferential movement of the tire and strip all around the wheel-rim, and means engaging the wheel-rim and fastening-strip and securing the tire within the channel and to the wheel-rim.

18. The combination, with a wheel-rim 8, of a channel fitted thereon, and a tire placed in said channel and comprising a substantially solid elastic body and tread having inserted in its base a series of layers of reinforcing fabric which are disposed vertically edgewise in the general plane of the tire or wheel and are separated by inwardly-extending layers or strata of the body and tread of the tire; said tire having a continuous annular bottom slot 4, a fastening-strip in said slot, pins 6 passed through transverse openings of the composite base portion of the tire and retaining the fastening-strip in the tire-slot, and bolts passed through the wheel-rim and channel and engaging the fastening-strip and securing the tire within the channel and to the wheel-rim.

19. The combination, with the wheel-rim 8, of a channel fitted thereon, and a tire placed in said channel and comprising a substantially solid elastic body and tread having inserted in its base a series of layers of reinforcing fabric which are disposed vertically edgewise in the general plane of the tire or wheel and are separated by inwardly-extending layers or strata of the body and tread of the tire; said tire having a continuous annular bottom slot 4 and a reinforcing fabric lining 12, 13, 14, covering the walls of said slot and the bottom and lower side faces of the tire, a fastening-strip in said fabric-lined slot, pins 6 passed through transverse openings of the composite base portion of the tire and retaining the fastening-strip in the tire-slot, and bolts passed through the wheel-rim and channel and engaging the fastening-strip and securing the tire within the channel and to the wheel-rim.

ARTHUR L. STEVENS.

Witnesses:
ALBERT J. DOTY,
JAMES PIERCE.